United States Patent
Carson

(10) Patent No.: US 7,784,328 B2
(45) Date of Patent: Aug. 31, 2010

(54) NOZZLE TESTING APPARATUS AND METHOD

(75) Inventor: Glenn Carson, Sarnia (CA)

(73) Assignee: CAR-BER Investments Inc., Point Edward (CA)

( * ) Notice: Subject to any disclaimer, the term of this patent is extended or adjusted under 35 U.S.C. 154(b) by 45 days.

(21) Appl. No.: 12/330,454

(22) Filed: Dec. 8, 2008

(65) Prior Publication Data
US 2009/0084165 A1  Apr. 2, 2009

Related U.S. Application Data

(63) Continuation of application No. PCT/CA2007/001034, filed on Jun. 12, 2007.

(60) Provisional application No. 60/804,530, filed on Jun. 12, 2006.

(51) Int. Cl.
*G01M 3/04* (2006.01)
(52) U.S. Cl. ..................................... 73/49.8
(58) Field of Classification Search ............. 73/49.8, 73/40, 37
See application file for complete search history.

(56) References Cited

U.S. PATENT DOCUMENTS 5,844,127 A   12/1998  Berube et al.
6,131,441 A   10/2000  Berube et al.
6,463,791 B1 * 10/2002 Berube et al. ............ 73/49.8

FOREIGN PATENT DOCUMENTS

| JP | 57190243 A | 11/1982 |
| JP | 61059239 A | 3/1986 |
| WO | WO 97/37206 A1 | 10/1997 |

* cited by examiner

*Primary Examiner*—Hezron Williams
*Assistant Examiner*—Nathaniel Kolb
(74) *Attorney, Agent, or Firm*—Santosh K. Chan; Blake, Cassels & Graydon LLP

(57) ABSTRACT

A method for testing the integrity of welds used to secure a nozzle to a vessel and the like comprises forming a sealed space within the nozzle by providing a blind against the flange and a sealing plate within the vessel and filling the space with a pressurizing fluid. The sealing plate is not biased against the flange. As such, the method of the invention simulates normally occurring axial expansion stresses within the nozzle thereby providing a more accurate test. The apparatus of the invention comprises a blind flange for sealing the flange face and a back plate for positioning against the inner surface of the vessel. The apparatus includes a biasing means for urging the back plate against the vessel wall. In one embodiment, the biasing means includes a front plate located outside of the vessel and connected to the back plate. In another embodiment, the biasing means comprises a plurality of magnets for engaging the vessel wall.

12 Claims, 6 Drawing Sheets

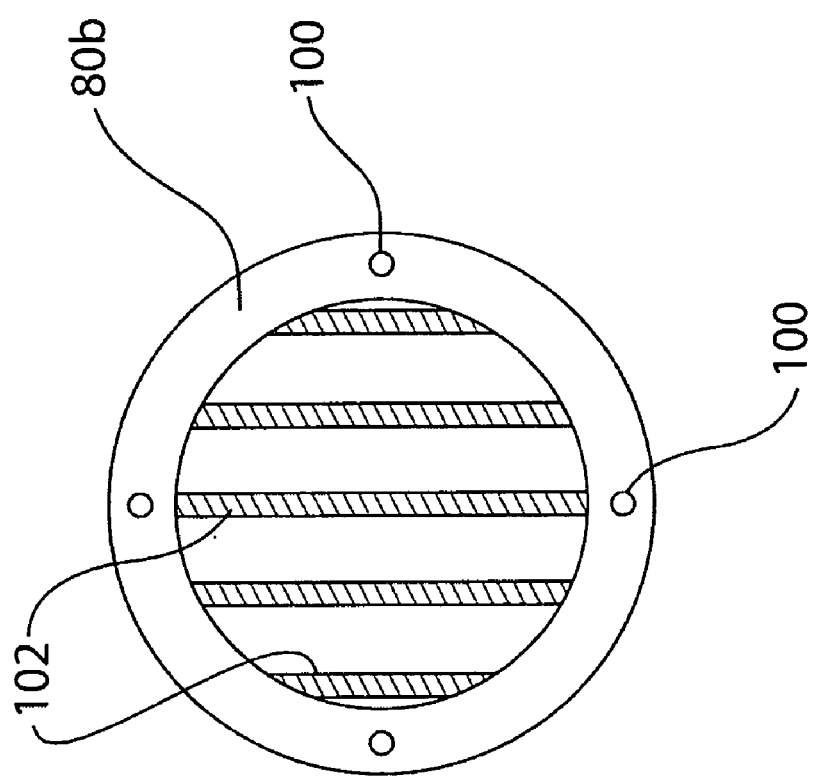

NOZZLE TESTING APPARATUS AND METHOD

CROSS REFERENCE TO RELATED APPLICATIONS

This application is a Continuation of PCT application number PCT/CA2007/001034, filed Jun. 12, 2007 and which claims priority from U.S. application Ser. No. 60/804,530, filed Jun. 12, 2006. The entire disclosures of these prior applications are incorporated herein by reference.

BACKGROUND OF THE INVENTION

1. Field of the Invention

The present invention relates to apparatus and methods for testing welds and, more particularly, for testing welds on nozzles or other such fixtures. In one particular aspect, the invention is suited for testing welds while simultaneously applying an axial stress within the nozzle.

2. Description of the Prior Art

In chemical or petrochemical plants etc., it is often necessary to convey fluidic materials from one location, or holding cell to another. The conveyance of such material normally includes equipment such as conduits or pipes, storage or reaction vessels etc., which are generally manufactured from metal. The joining of separate pieces of the conveying equipment is generally achieved by welding the necessary pieces together. For example, when joining adjacent ends of pipe together, it is common for each end to be provided with flanges, welded to each respective end, which are then bolted together to form a seal. Alternatively, the ends of pipes or other equipment may be welded directly together for form the necessary conduit. In either case, it will be appreciated that each welded joint must form a complete seal so as to prevent leakage of the materials being transported. This is particularly the case when handling potentially hazardous (i.e. flammable) or toxic materials.

For reasons of safety, it is often necessary to periodically test the integrity of the welds used in joining the various pieces of equipment (such as pipes, vessels, flanges and the like) together. However, a particular problem is encountered when attempting to test the integrity of welds used in joining a nozzle to a pipe or vessel. Nozzles generally comprise a short conduit with one end inserted into or abutting an opening in a pipe or vessel and an opposite end having a flange. The joints between the conduit portion of the nozzle and the pipe or vessel and the flange, respectively, are sealed with welds. As is known in the art, nozzles can range in size from less than an inch to up to several feet in diameter.

The prior art teaches various tools for conducting weld integrity tests on conduits. For example, U.S. Pat. Nos. 6,131,441 and 5,844,127 (Berube and Carson) (the entire disclosures of which are incorporated herein by reference) teach weld testing tools which isolate a particular section of a pipe (for example, a section including a weld) and subject the section to a high pressure fluid within a constrained annular space defined by the tool and the inner surface of the pipe. The pressure of the fluid within the annular space is monitored whereby any pressure drop signifies a leak in the weld.

U.S. Pat. No. 6,463,791 (Berube and Carson) (the entire disclosure of which is incorporated herein by reference) teaches an apparatus for testing welds used to secure nozzles. As shown in FIG. 1 of this reference, the apparatus comprises a first seal plate that is placed on the inner surface of the vessel (for example) and a second seal plate that is secured to the outer, flange portion (i.e. the flange face) of the nozzle. The seal plates are connected to each other and the seals are formed by urging one against the other. In this manner, the nozzle volume is sealed and a pressurizing fluid is introduced therein. As will be understood, the process of urging the plates towards each other causes an axial compressive force to be applied on the flange and hence the welds provided on the nozzle.

Although the above-described references provide efficient tools for testing welds, they are designed to apply mainly a radial force against the weld. However, there exists a need for exerting further stresses on welds for providing a "worst case scenario" so that such welds can be tested under extreme conditions. More particularly, there exists a need to conduct weld tests while applying an axial expansion force on the welds being tested.

SUMMARY OF THE INVENTION

In one aspect, the present invention provides a method of testing welds provided on a nozzle comprising: sealing the opposite ends of the nozzle; pressurizing the interior of the nozzle; monitoring the nozzle internal pressure; without applying an axial compressive force on the nozzle. Such method would, therefore, simulate normal axially expansive stresses on the weld during the test and increase the accuracy of thereof.

In another aspect, the present invention provides a weld testing apparatus or assembly for testing the integrity of welds securing a nozzle to a vessel and the like wherein the apparatus includes: a means to seal the flange end of the nozzle; a means to seal the vessel opening end of the nozzle; and a means to pressurize the nozzle interior. The apparatus also includes a means for monitoring the pressure within the nozzle for identifying the presence of leaks or other defects in the welds.

Thus, in one aspect, the invention provides a weld testing apparatus for testing welds securing a nozzle to a vessel, the nozzle having a stem portion welded to an opening in the vessel wall and an opposite flange portion extending outward from the opening, the flange having an outer face, the apparatus comprising:

a blind for mounting on the flange outer face for sealingly closing the flange;

a back plate for mounting within the vessel to close the vessel opening;

a means for biasing the back plate against the vessel wall to form a seal there-between;

a means for pressurizing the space within the nozzle between the blind and the back plate.

In another aspect, the invention provides a method of testing the integrity of a weld securing a nozzle to a vessel, the nozzle having a stem portion welded to an opening in the vessel wall and an opposite flange portion extending outward from the opening, the flange having an outer face, the method comprising:

sealing the flange face with a blind;

providing a back plate within the vessel, the back plate being larger than the opening;

urging the back plate towards the vessel wall to form a seal there-between, without applying a compressive force on the flange;

creating a sealed space within the nozzle, the space being bounded by the inner surface of the nozzle, the blind and the back plate, the space encompassing a region containing the weld;

filling and pressurizing the space with a pressurizing fluid, whereby a radial expansion stress is applied against the nozzle and an axial expansion stress is applied against the flange;

monitoring the pressure.

BRIEF DESCRIPTION OF THE DRAWINGS

These and other features of the invention will become more apparent in the following detailed description in which reference is made to the appended drawings wherein:

FIG. 6 is a perspective view of the backplate shown in FIG. 5.

DETAILED DESCRIPTION OF THE INVENTION

Throughout the description of the invention the following terms will be assumed to have the following associated meanings:

"Vessel"—will be understood to mean any equipment or apparatus to which a nozzle is attached. As such, the term "vessel" will include vessels per se, pipes, drums, and any other similar equipment. It will be understood that the term "vessel" is used herein simply as a convenient way to encompass all such equipment or apparatus.

"Annular"—this term is used to describe a body having at least one outer diameter and at least one inner diameter. Thus, an "annular tube" will be assumed to be a hollow tube with an inner and outer diameter. An "annular disc" will be assumed to be an object having an outer diameter and a central aperture thereby providing an inner diameter.

"Axial"—this term will be used to describe a direction taken along the longitudinal axis of the stem of the nozzle. Thus, "axial force" or "axial stress" will be understood as being a force applied in a direction parallel to the longitudinal axis of the nozzle. In general, the term "axial stress" is used herein to refer to an axial expansion stress unless otherwise noted.

Figure 1:
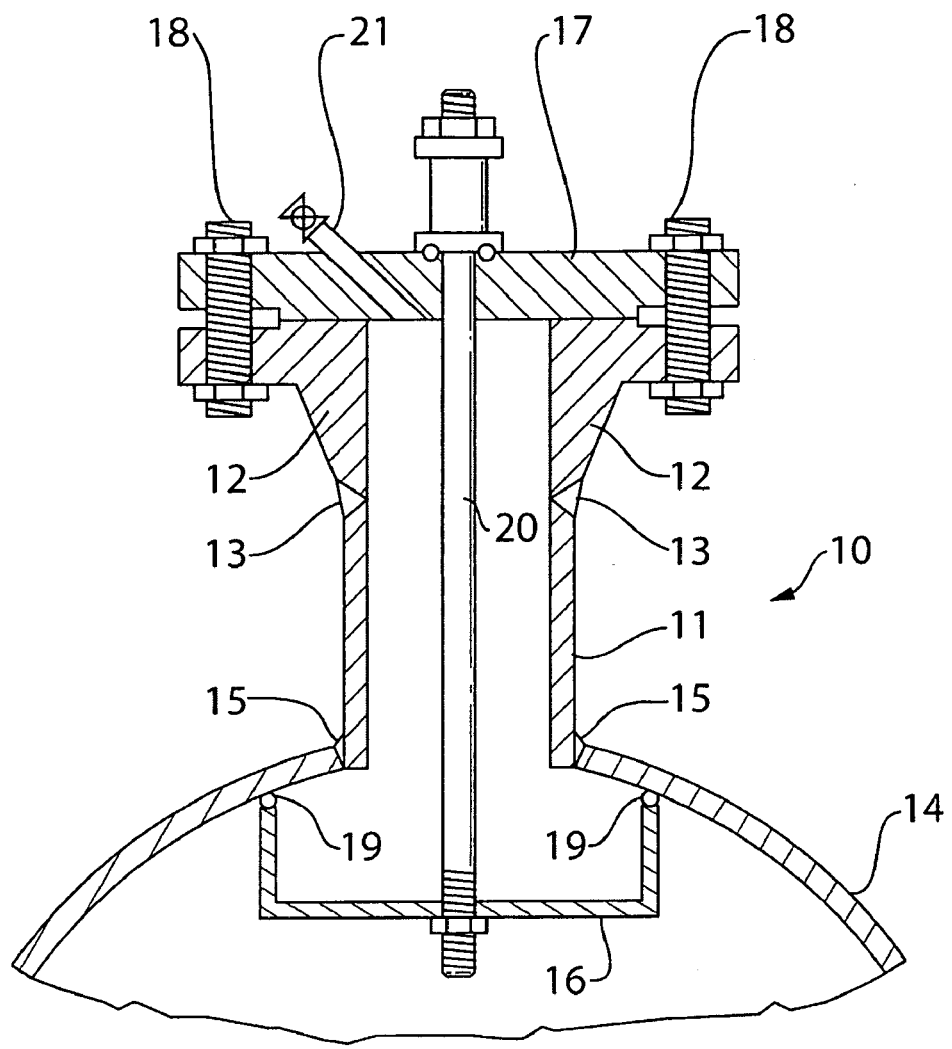
FIG. 1 is a cross sectional view of a weld testing apparatus for nozzles as known in the prior art.

FIG. 1 illustrates a nozzle weld testing apparatus as known in the art and as taught in U.S. Pat. No. 6,463,791. As shown, the nozzle 10, includes a stem 11 and a flange 12 joined to one end of the stem by a weld 13. The opposite end of the stem 11 is joined to an opening in the vessel 14 by means of another weld 15. It will be understood that the vessel wall would normally have a curved cross section, as shown in FIG. 1; however, for convenience, the remaining figures illustrate schematically a flat wall. It will also be understood that the stem 11 may extend partially within the vessel 14 as is commonly known. Again, for convenience, the stem of the nozzle is shown in the present figures as terminating at the vessel wall. The apparatus of the invention would therefore be adaptable to suit any configuration. The testing apparatus of the prior art includes a first, inside seal plate 16 that is placed within the vessel 14 so as to seal the inside end of the nozzle. The apparatus also includes a second, outside seal plate 17 that is positioned against the flange 12 and joined thereto by means of bolts 18. It will be understood that gaskets, O-rings, and other such sealing members will be used as known in the art to achieve the desired sealing. For example, a seal between the inside plate 16 and the wall of the vessel 14 may be achieved using an O-ring 19. The inside and outside seal plates 16 and 17 are joined together by one or more tie rods 20. Tightening of the tie rod 20 causes the inside plate to be sealed against the inner surface of the vessel wall. This results in the volume of the nozzle 10 being sealed off. A port 21 is used to introduce a pressurizing fluid into the nozzle volume. In order to conduct the test, the pressure within the nozzle is raised to the desired level and monitored. Any pressure drop or leakage is indicative of a weakness or leakage in the welds 13 and 15.

As discussed above, the prior art apparatus, although efficient and accurate, applies a radial force or stress against the welds 13 and 15. As will be understood by persons skilled in the art, a further stress that the nozzle would be subjected to in normal operation is an axial force resulting from the pressure of the contents in the vessel 14 impinging upon the flange 12.

Figure 2:
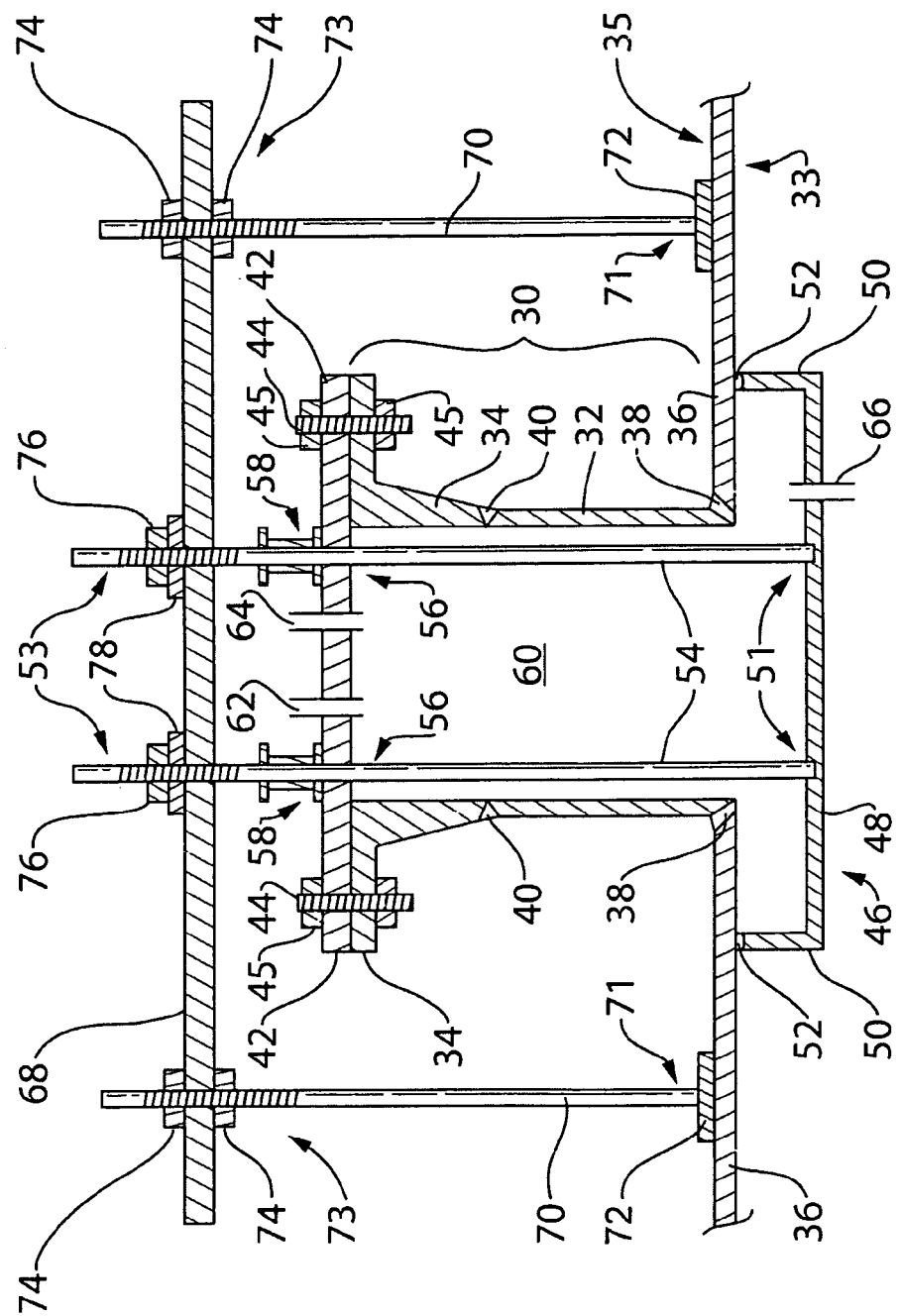
FIG. 2 is a cross sectional view of the apparatus of the invention according to one embodiment.

FIG. 2 illustrates a nozzle testing tool according to one aspect of the present invention. As shown, a nozzle 30 includes a pipe portion, or stem 32 and a flange 34, similar to the nozzle illustrated in FIG. 1. The stem 32 is connected to an opening in a vessel wall 36 by means of welds 38. The flange 34 of the nozzle is connected to the stem 32 by welds 40. For the purposes of this description, the term "vessel" is used to mean any type of equipment having a nozzle attached thereto. Thus, a "vessel" may include a pressure vessel, holding tank, a pipe etc.

The apparatus of the invention includes a blind flange 42 that is bolted to the flange outer face. This is done using bolts 44 and associated nuts 45, with the bolts extending through the boltholes normally provided on the flange face. Although not shown, it will be know to persons skilled in the art that gaskets etc. may also be used at the interface between the flange and the blind flange. On the opposite end of the nozzle, a back plate 46 of the apparatus is provided within the vessel. As shown, the back plate 46 generally comprises a pan having a base 48 and a generally perpendicularly extending rim 50. The back plate 46 is sized to be larger than the vessel opening so that the rim 50 contacts the inner surface 33 of the vessel wall 36. The rim 50 is also provided with a sealing means 52, such as an O ring or the like so that the rim 50 forms a pressure seal with the vessel wall 36, as described further below. For convenience, the sealing means 52 will be further referred to as an O ring; however, it will be understood that this terminology is not meant to limit the sealing means 52 in any way.

The back plate 46 is provided with one or more tie rods 54 that extend through the nozzle 30, the tie rods having first ends 51 attached to the back plate 46 and second ends 53 extending outwardly through the nozzle 30. The tie rods 54 may be permanently attached to the back plate 46 by welds etc. or may be secured thereto with nuts etc. (in such case, the back plate 46 will be provided with suitable apertures for receiving the rod first ends 53). Alternatively, the tie rods may include threaded ends for engaging complementary threaded holes in the back plate 54. Various alternatives will be apparent to persons skilled in the art for attaching or securing the tie rods 54 to the back plate 46.

The second ends 53 of the tie rods 54 extend through the flange 34 of the nozzle and through apertures 56 provided in the blind flange 42. The tie rods 54 are provided with a sealing means 58 to ensure that the apertures 56 on the blind flange are sealed. The sealing means may comprise for example a packing gland, an O ring etc. In one example, the sealing means comprises a packing box as commonly known in the art. For convenience, the sealing means 58 will be referred to herein as a packing gland; however, it will be understood that such terminology is not meant to limit the sealing means 58 in any way. As discussed further below, upon installation of the apparatus of the invention within a nozzle, the combination of the packing glands 58 and the O ring 52 establishes a sealed space or region 60 within the nozzle bounded by the back plate 46, the blind flange 42 and the nozzle segments (i.e. the stem 32 and the flange 34) and a portion of the vessel wall 36. In this regard, it will be understood by persons skilled in the art that the number of tie rods 54 required will depend upon the diameter of the tool being used. For example, for smaller diameter tools, a single tie rod 54 may be sufficient. However, for larger diameters, a plurality of tie rods may be required, with such tie rods being circumferentially equidistantly spaced.

The blind flange is also preferably provided with a fill port 62 and a vent port 64. Such ports serve to allow a pressurizing fluid to enter within the sealed space 60. The vent ports are connected known equipment such as piping, hoses etc., not shown, which, in turn, are connected to other needed equipment such as a source of the pressurizing fluid, pressure gauges, etc., also not shown. The apparatus may optionally also include one or more fill or vent ports 66 provided on the back plate 46. Various other means of filling and venting the sealed space 60 will be known to persons skilled in the art.

As described in the art, in conducting an integrity test on the welds 38 and 40, the sealed space 60 is first created and then filled with a pressurizing fluid so as to pressurize the sealed space 60 to a desired high pressure value. The pressure is then monitored to determine the integrity of the welds. As known in the art, any pressure loss signifies a leaking weld.

It will be appreciated by persons skilled in the art that the apparatus of the invention allows for the development of an axial expansion force on the welds while the pressure test is being conducted. As explained above, the application of such an axial stress serves to provide more accurate test results by simulating "normal" operating conditions. More specifically, the apparatus of the invention is further provided with a front support plate 68 that is axially outwardly separated from the blind flange 42, that is, in a direction away from the nozzle 30. A plurality of separator rods 70 are also provided having a first end 71 adjacent the vessel and a second end 73 directed away there-from. The first ends 71 of the separator rods 70 are preferably provided with a bearing pad 72 positioned against the outer surface 35 of the vessel wall 36. The bearing pad 72 may comprise a single unit, in which case having a generally annular shape. Alternatively, a number of individual pads may be provided on the ends of each of the rods 70. The second ends 73 of the separator rods 70 extend through apertures provided in the front plate 68. Nuts 74 are provided on the second ends of the separator rods 70 so as to locate and lock the front plate 68 in the desired position, a set distance away from the blind flange 42. For this purpose, it will be understood that the second ends 73 of the separator rods are adequately threaded to allow the front plate 68 to be adjusted longitudinally along the central axis of the nozzle to the desired position. It will also be understood that the separator rods are preferably circumferentially equidistant with respect to each other so as to equally divide the load there-between.

The front plate also includes apertures to receive the outer ends 53 of the tie rods 54 as shown in FIG. 2. The tie rods are the secured, preferably in a releasable manner, to the front plate. In a preferred embodiment, the tie rods 54 are secured to the front plate 68 by nuts 76. Washers 78 may also be provided. As indicated above, the opposite ends of the tie rods 54 are secured to the back plate 46. Thus, as will be understood, as the nuts 76 are tightened, the back plate 46 is forced against the inner surface 33 of the vessel wall 36 and, with the inclusion of the seal 52, the back plate 46 eventually forms a seal with the vessel wall. As will also be understood by persons skilled in the art, with the combination of the tie rods 54, the front plate 68 and the separator rods 70, any tightening of the nuts 76 (to cause the back plate 46 to bear against the inner surface 33 of the vessel wall 36) results in an opposing force applied by the first ends 71 of separator rods against the outer surface 35 of the vessel wall 36 (the latter force preferably being conducted through the bearing pads 72). Thus, as will be understood, no compressive force is applied to the flange 34 of the nozzle 30. In the result, any pressure built up within the sealing area 60 results in an axial force being applied to the inner surface of the blind flange 42. However, since the blind flange 42 is secured to the flange 34 of the nozzle, such axial force is therefore also applied to the nozzle and, in turn, to the welds 38 and 40. As will be appreciated by persons skilled in the art, a pressure test conducted in this manner would more accurately simulate normally occurring stresses and enable the test results to be more dependable.

In one embodiment, the bearing pads 72 of the apparatus may comprise electromagnets so as to allow the first ends 71 of the separator rods 70 to be positively located on the outer surface 35 of the vessel wall 36 prior to engaging the nuts 76 coupled to the tie rods 54. As will be understood, this will aid in installing the apparatus since, in such case, the front plate 68 would not need to be held while tightening the nuts 76. Electromagnets of this type are commonly known. The associated electrical connections and power source etc. are not shown for convenience.

Figure 3:
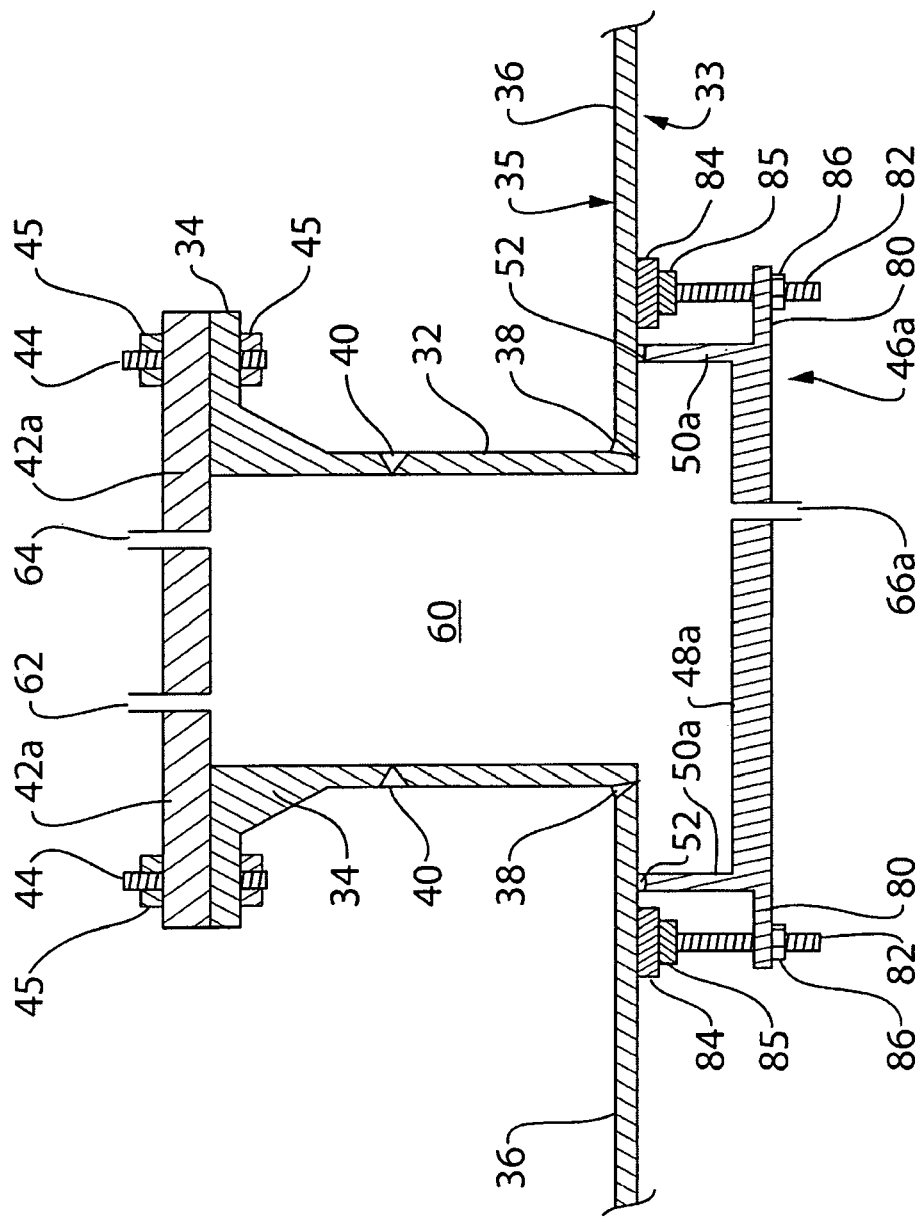
FIG. 3 is a cross-sectional view of the apparatus of the invention according to another embodiment.

A further embodiment of the apparatus of the invention is shown in FIG. 3 where like elements are identified with the same reference numeral but with the letter "a" added for clarity where a change is included. In this embodiment, the need for a front plate (as discussed above) is obviated. Specifically, as shown in FIG. 3, the apparatus includes a blind flange 42*a* and a back plate 46*a*. The blind flange 42*a* comprises generally a plate having a number of boltholes through which are passed bolts 44 when the blind flange is mounted in position. The blind flange can be secured to the open outer face of the flange 34 using the bolts 44 and the associated nuts 45 as is commonly known. The blind flange 42*a* also includes fill and vent ports 62 and 64 as discussed above. As also mentioned above, it will be understood that any type of gasket or other such sealing means can be provided between the blind flange and the flange face to provide the needed seal. Such gaskets are commonly known in the art.

Figure 4:
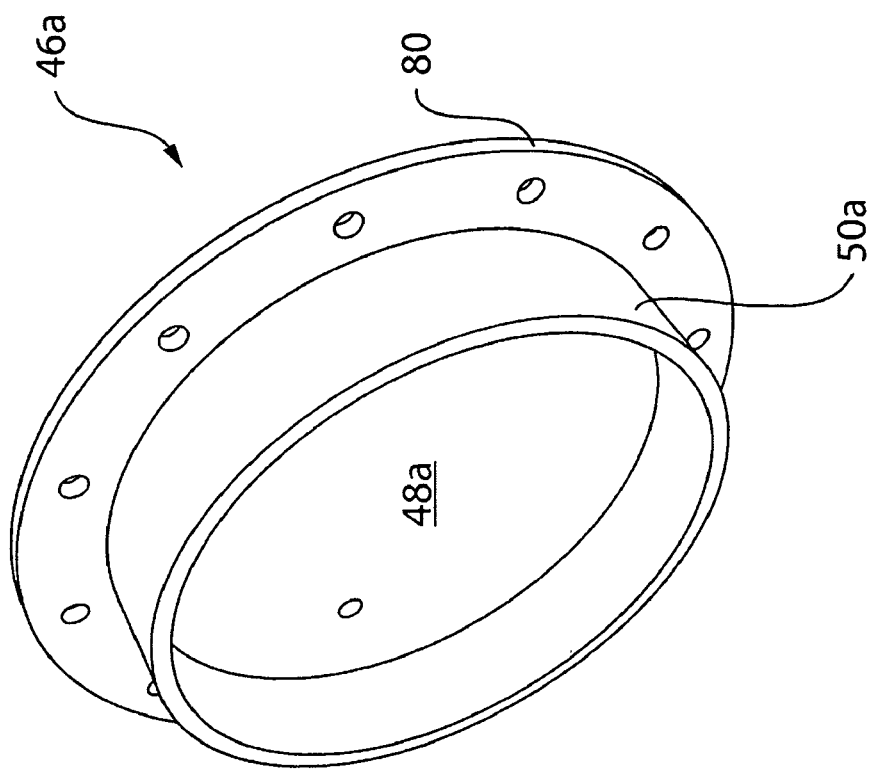
FIG. 4 is a perspective view of the backplate shown in FIG. 3.

As shown in FIGS. 3 and 4, the back plate 46*a* of this embodiment comprises a base 48*a* and a perpendicularly extending rim 50*a*. As before, the back plate 46*a* is sized to be larger in diameter than the opening in the vessel wall 36 for receiving the stem 32 of the nozzle. An O ring 52 or such seal is provided at the terminal end of the rim 50*a* so as to enable a seal to form between the rim 50*a* and the inner 33 surface of the vessel wall 36. Preferably, the terminal end of the rim 50*a* includes a groove to receive the O ring. The back plate 46*a* also includes a flange 80 extending radially outward from the base 48*a*. It will be appreciated that the flange 80 may be integral with the base 48*a*. As before, the back plate 46*a* may include one or more ports 66*a*.

The flange 80 is provided with a plurality of holes adapted to receive bolts 82. The bolts 82, in turn, are connected to electromagnets 84 by either welding or screwing the sections together. In one embodiment, the magnets 84 are provided with a nut 85 into which the bolts can be screwed. Nuts 86 are also provided on the opposite ends of the bolts 82 for securing the back plate thereto.

The operation of the apparatus of FIG. 3 will now be described. Firstly the blind flange 42a is positioned and secured to the outer face of the flange 34 by means of the bolts 44 and the associated nuts 45. The back plate 46a is then positioned against the inner surface 33 of the vessel wall 36. Preferably, the bolts 82 are already provided on the flange 80 of the back plate 46a, albeit in a loose manner. Once the back plate 46a is in the desired position (i.e. covering the opening in the vessel wall 36), the electromagnets 84 are activated. Such activation causes an attractive force to be developed between the magnets 84 and the inner surface 33 of the vessel wall 36. As will be understood, such attraction is possible where the vessel wall is made of a ferrous metal. In one embodiment, the magnets 84 can be provided on a ring and secured to the inner surface 33 at one time. It will be appreciated that this option would offer the convenience of having all magnets, with the associated bolts 82 secured in pre-set relative positions so that placement of the back plate 46a onto the bolts 82 is facilitated. Various other variations of such attachment means will be apparent to persons skilled in the art.

Once the magnets 84 are activated and secured against the vessel wall 36, the nuts 86 are tightened causing the rim 50a of the back plate 46a to be forced against the inner surface 33 of the vessel wall 36. The nuts 86 are tightened until a sufficient seal is developed between the rim 50a and the inner surface 33 of the vessel wall 36. As indicated above, an O ring or other similar device is provided to assist in forming such seal. With the back plate 46a thus positioned and with the blind flange secured to the flange 34 face, a sealed space 60 is formed as discussed above. At this point, by means of one or more of the ports 62, 64, and 66a, a suitable pressurizing fluid is introduced to fill and pressurize the sealed space 60. Such pressure is then monitored for a period of time so as to assess the integrity of the welds 38 and 40. As before, it will be understood that with no axial compressive force applied to the nozzle, the pressure within the sealed space 60 serves to exert an axial expansion force on the nozzle elements and, therefore, on the welds 38 and 40. Such axial force simulates normally occurring forces during operation of the nozzle and vessel. Thus, the invention provides an accurate assessment of the weld integrity.

Electromagnets 84 are commonly known and available and the required electrical connections and power source etc. are not shown in the figures for convenience. It will be understood that the strength of the magnets 84 will depend upon various factors including the weight of the back plate 46a, the pressure developed within the sealed space 60 etc. Persons skilled in the art will be easily able to determine the required magnetic strength based on these variables.

In the above description, the back plate 46, 46a has been described as comprising a single piece. However, in consideration of weight and size, the back plate may also be provided in two or more section to facilitate entry of same into the vessel. In such case, it will be understood that the back plate sections will be provided with a connection means such as flanges for receiving bolts etc. Also, an appropriate sealing means will also be provided so as to seal any joints between the sections making up the back plate.

Figure 5:
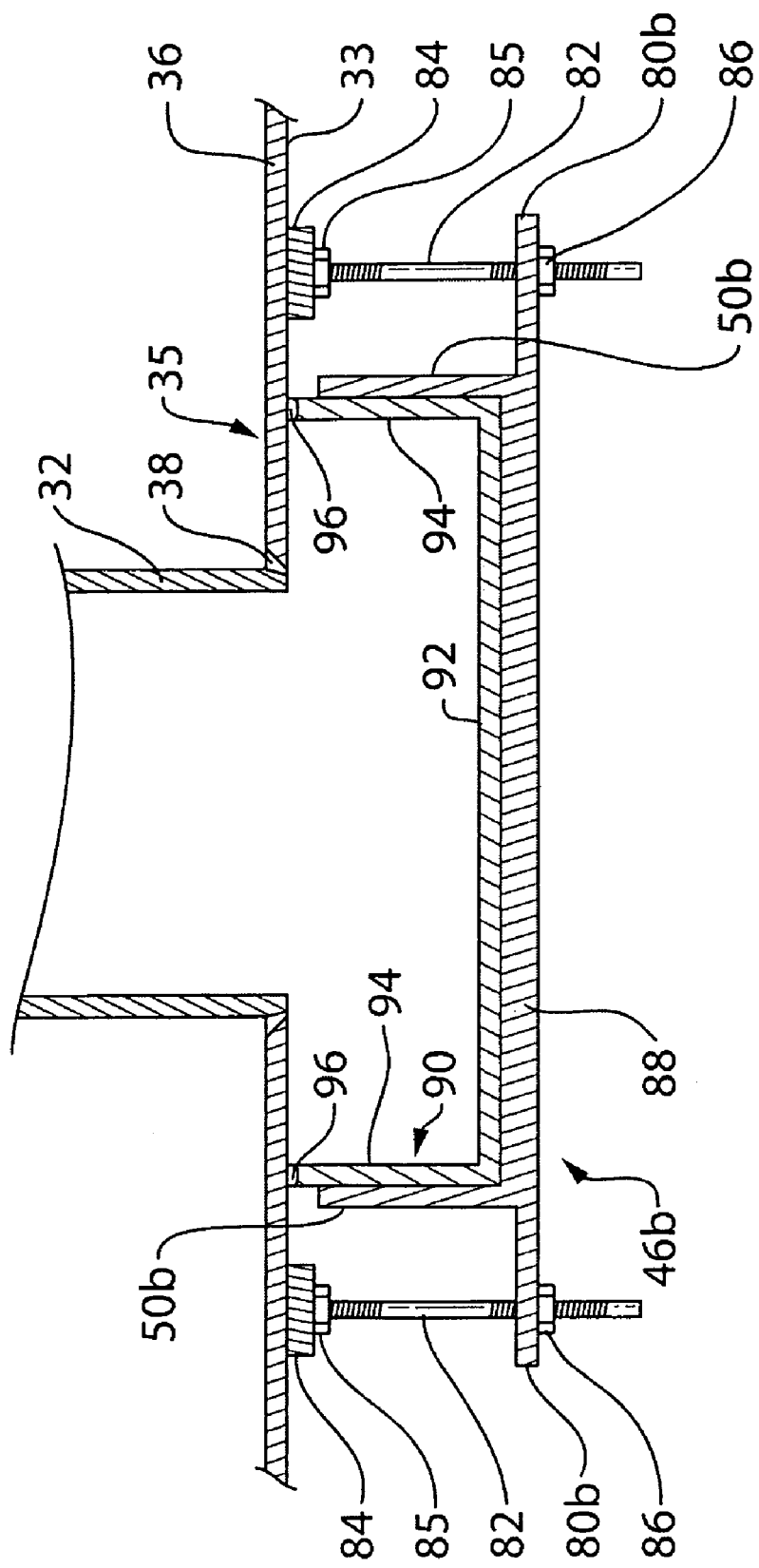
FIG. 5 is a cross-sectional view of the apparatus of the invention according to another embodiment.

FIG. 5 illustrates a variant of the apparatus of FIG. 3 where like elements are identified with the same reference numeral but with the letter "b" added for clarity where a change is included. In FIG. 5, the flange portion of the nozzle is not shown for convenience but will be understood to be the same as that shown in FIG. 3. That is, the apparatus of FIG. 5 includes the same blind flange as shown in FIG. 3. In the embodiment shown in FIG. 5, the back plate 46b comprises a cage formed from support bars. The bars may be provided in any orientation such as parallel, intersecting, or as radii. FIG. 6 illustrates one example of the back plate 46b of FIG. 5. As shown in FIGS. 5 and 6, the back plate 46b includes a flange 80b which includes a plurality of apertures 100 through which extend the bolts 82. A plurality of support bars 102 are provided across the diameter of the flange 80b. It will be understood that the "cage" can be constructed in any shape or configuration to serve the purposes outlined below.

As with the embodiment described above, the bolts are secured to electromagnets 84, which bear against the inner surface 33 of the vessel wall 36. The back plate flange 80b is secured to the nuts 82 by means of nuts 86.

The back plate 46b shown in FIG. 5 includes a cup-like insert 90 contained within the rim 50b. The insert generally has a base 92 and a generally perpendicularly extending rim 94. The insert 90 is oriented with its opening directed towards the opening in the vessel wall and is provided with a seal such as an O ring 96 on exposed edge of the rim.

The back plate 46b of FIG. 5 is installed in generally the same manner as with the apparatus of FIG. 3 described above. However, it will be understood that, in this case, the insert 90 is also installed. Once the elements of the back plate 46b are in position, and after the electromagnets 84 are activated, the nuts 86 are tightened. Upon such tightening, the insert 90 is advanced against the inner surface 33 of the vessel wall 36 so as to form a seal between the wall surface 33 and the edge of the rim 94. As will be appreciated, the O ring 96 serves to facilitate the formation of such seal. In order to ensure that the rim 50b does not interfere or limit the advancement of the insert 90 against the vessel wall, and therefore potentially limit the formation of the seal, it is preferred that the rim 94 of the insert 90 extends beyond the rim 50b of the back plate 46b. As shown in FIG. 5, it is preferred that a degree of clearance be provided between the vessel inner surface 33 and the edge of the rim 50b. Once the back plate 46b is installed, the blind flange (such as that shown at 42a in FIG. 3) can also be installed and the weld integrity test conducted.

It will be appreciated that the apparatus of FIG. 5 has various advantages. Primarily, by providing a back plate 46b in the form of a cage, or support structure only (i.e. with a number of opening formed by the members forming the cage), the weight of the back plate is considerably reduced. This facilitates the carrying and installation of the back plate. The insert 90 would preferably be made from any preferably rigid, lightweight material such as plastic, metal (e.g. aluminum) etc. thereby providing the same reduced weight advantages. The cage portion of the back plate 46b would be designed to provide sufficient support strength to the material of the insert 90 while the test is being conducted.

It will be understood that the above discussion has used geometric terms such as annular, circumference etc., for ease of reference. However, these terms should not be construed as limiting the invention to any specific shape of nozzle and various modifications of the apparatus will be apparent to persons skilled in the art to adapt same to any shape or design of nozzles. Also, as discussed above, it will be understood that the shape of various parts of the apparatus (particularly those contacting the vessel wall) will be complementary to the shape of the vessel.

Although the invention has been described with reference to certain specific embodiments, various modifications thereof will be apparent to those skilled in the art without departing from the spirit and scope of the invention as outlined in the claims appended hereto. The disclosures of all prior art recited above are incorporated herein by reference in their entirety.

We claim:

1. A weld testing apparatus for testing welds securing a nozzle to a vessel, said nozzle having a stem portion welded to an opening in the vessel wall and an opposite flange portion extending outward from said opening, the flange having an outer face, wherein, when in use, the apparatus comprises:
   a blind for mounting on said flange outer face for sealingly closing the flange;
   a back plate for mounting within the vessel to close the vessel opening;
   an urging means biased against the inner or outer surface of the vessel wall for urging the back plate against the interior surface of the vessel wall to form a seal therebetween; and
   a means for pressurizing the space within the nozzle between the blind and the back plate;
   wherein, the urging means comprises:
   a front plate for mounting in front of the blind, the front plate having a support means biased against the outer surface of the vessel wall;
   one or more tie rods connected to and extending between the front plate and said back plate and through said blind; and,
   and a tightening means for forcing the back plate towards the front plate.

2. The apparatus of claim 1 wherein said tightening means comprises one or more nuts provided on threaded ends of said tie rods.

3. The apparatus of claim 1 wherein said support means comprises two or more support rods each having a first end biased against the wall of the vessel and a second end connected to the front plate.

4. The apparatus of claim 3 wherein the first ends of the support rods include one or more magnets for attachment to the vessel wall.

5. The apparatus of claim 1 wherein said urging means further comprises:
   one or more attachment means attached to the inner surface of the vessel wall, each of said attachment means including a threaded rod for extending through a flange provided on the back plate; and,
   one or more nuts associated with each of said threaded rods for forcing the back plate against the inner surface of the vessel wall.

6. The apparatus of claim 5 wherein said attachment means comprises magnets.

7. A weld testing apparatus for testing welds securing a nozzle to a vessel, said nozzle having a stem portion welded to an opening in the vessel wall and an opposite flange portion extending outward from said opening, the flange having an outer face, the apparatus comprising:
   a blind for mounting on said flange outer face for sealingly closing the flange;
   a back plate for mounting within the vessel to close the vessel opening;
   a front plate for mounting in front of the blind, the front plate having a support means biased against the outer surface of the vessel wall;
   one or more tie rods connected to and extending between the front plate and said back plate through said blind;
   a means for urging the back plate towards the front plate; and,
   a means for pressurizing the space within the nozzle between the blind and the back plate.

8. The apparatus of claim 7 wherein said means for urging the back plate comprises nuts provided on threaded ends of said tie rods.

9. The apparatus of claim 8 wherein said support means comprises two or more support rods each having a first end biased against the wall of the vessel and a second end connected to the front plate.

10. The apparatus of claim 9 wherein the first ends of the support rods include one or more magnets for attachment to the vessel wall.

11. A method of testing the integrity of a weld securing a nozzle to a vessel, said nozzle having a stem portion welded to an opening in the vessel wall and an opposite flange portion extending outward from said opening, the flange having an outer face, the method comprising:
   sealing the flange outer face with a blind;
   providing a back plate within the vessel, said back plate being larger than the opening;
   biasing an urging means against the outer surface of the vessel wall;
   connecting the back plate to the urging means and forcing the back plate towards the vessel wall to form a seal there-between;
   creating a sealed space within the nozzle, said space being bounded by the inner surface of the nozzle, the blind and the back plate, said space encompassing a region containing said weld;
   filling and pressurizing said space with a pressurizing fluid;
   monitoring said pressure.

12. A method of testing the integrity of a weld securing a nozzle to a vessel, said nozzle having a stem portion welded to an opening in the vessel wall and an opposite flange portion extending outward from said opening, the flange having an outer face, the method comprising:
   sealing the flange face with a blind;
   providing a back plate within the vessel, said back plate being larger than the opening;
   urging the back plate towards the vessel wall, by applying a biasing force against the outer surface of the vessel wall, to form a seal there-between;
   creating a sealed space within the nozzle, said space being bounded by the inner surface of the nozzle, the blind and the back plate, said space encompassing a region containing said weld;
   filling and pressurizing said space with a pressurizing fluid;
   said pressurizing fluid also applying a radial expansion stress against the nozzle and an axial expansion stress applied against the flange;
   monitoring said pressure.

* * * * *